P. C. BRENNER.
OVEN DOOR.
APPLICATION FILED JULY 2, 1913. RENEWED JULY 28, 1914.
1,112,255.
Patented Sept. 29, 1914.
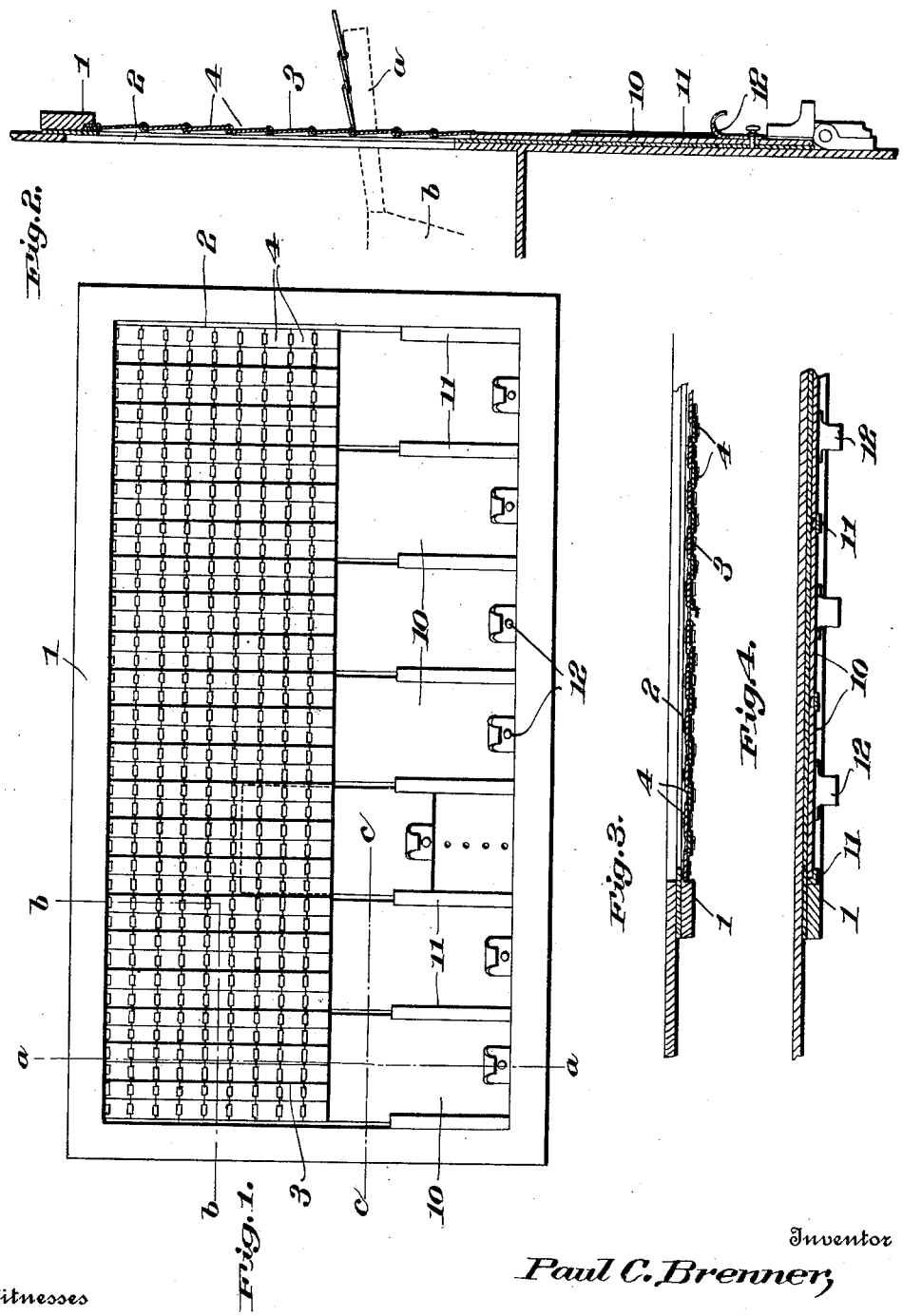
Inventor
Paul C. Brenner,
By Victor J. Evans
Attorney
Witnesses

_UNITED STATES PATENT OFFICE._

PAUL C. BRENNER, OF CHICAGO, ILLINOIS.

OVEN-DOOR.

1,112,255.  Specification of Letters Patent.  Patented Sept. 29, 1914.

Application filed July 2, 1913, Serial No. 777,106. Renewed July 28, 1914. Serial No. 853,690.

*To all whom it may concern:*

Be it known that I, PAUL C. BRENNER, a citizen of the United States, residing at Chicago, in the county of Cook and State of Illinois, have invented new and useful Improvements in Oven-Doors, of which the following is a specification.

This invention relates to improvements in oven doors for ranges and cook stoves and embodies a door of improved construction which permits a frying pan, skillet or other utensil having a handle to be placed in an oven and the door closed and yet permit the handle of the utensil to stick out through an opening in the door, thus preventing the handle from becoming heated and also enabling the handle to serve as a reminder to the cook that such utensil is in the oven and prevent the cook from forgetting the same and causing the contents of the utensil to be burned, the invention consisting of an oven door having an opening and a closure for the opening, the closure comprising a plurality of overlapping members mounted for movement to afford a passage for an object such as a hand handle through said opening and to close by gravity around the said object and prevent heat from escaping from the oven as hereinafter described and claimed.

In the drawing:—Figure 1 is an elevation of an oven door constructed in accordance with my invention. Fig. 2 is a sectional view of the same, on the plane indicated by the line $a$—$a$ of Fig. 1. Fig. 3 is a sectional view on the plane indicated by the line $b$—$b$ of Fig. 1. Fig. 4 is a similar view on the plane indicated by the line $c$—$c$ of Fig. 1.

In accordance with my invention, an oven door 1 which may be otherwise of any suitable construction and may be of any suitable size and shape is provided with an opening 2. This opening is covered by a closure 3 which is made up of a series of overlapping members 4 which are so mounted as to enable them to be moved pivotally in a vertical plane to afford a passage for the handle $a$ of a pan or other utensil $d$ in the oven, so that when the door is closed, the handle of the utensil sticks out through the opening 2 in the door and also through the closure of the said opening and the overlapping members of the closure by gravity close around the handle to prevent loss of heat from the oven.

The door 1 is of greater vertical extent than the opening in the side of the oven so that the lower side of the door extends below the bottom 5 of the oven. The hinges of the door are at its lower side and are indicated at 6 and the door has stops 7 to hold it in horizontal position when opened.

The closure 3 is a curtain which normally covers the entire oven door opening 2, the curtain comprising a series of vertical strips 8, each composed of a series of the overlapping members 4, said members being pivotally connected together as at 9.

Below the door opening 2 are vertically movable slides 10 which are mounted in vertical guides 11 with which the door is provided. Each slide has a finger piece 12, at its lower end, on its outer side, to enable it to be readily raised or lowered and the upper end of each slide is overlapped by the curtain or closure 3. When a pan or other utensil $d$ is in the oven, with its handle sticking out, one of the slides is moved up to bear against the underside of the handle, and the displaced members 4 of the curtain or closure 3 bear on the handle as shown in Fig. 2.

It will be observed that the guides 11 are below the door opening. The slides when in normal position, are also entirely below the door opening and when one of the slides is raised to close against the lower side of a projecting handle no portion of the door opening is exposed and hence the oven is kept effectually closed.

I claim:—

1. An oven having a door to close the same and also extending below the bottom of the oven and provided with an opening above the oven bottom, a curtain carried by the door and normally closing the opening thereof, the said curtain comprising a plurality of flexible strips arranged side by side, the said door also having a vertically movable slide normally arranged below the said opening and adapted to be moved upwardly to partly cover said opening when one or more of the flexible strips are displaced by a projecting handle or the like.

2. An oven having a door to close the same, the said door also extending below the bottom of the oven and having an opening above the oven bottom, a curtain carried by the door and normally forming a closure for said opening, the said curtain comprising a plurality of flexible vertical strips arranged side by side, the said strips being composed of members pivotally connected together for vertical movement, and a vertically movable slide carried by the door and normally arranged below the opening thereof, said slide being adapted to be raised to close against the under side of an object projecting outwardly through the door opening, when one or more of the said strips are displaced entirely or in part by said object.

In testimony whereof I affix my signature in presence of two witnesses.

PAUL C. BRENNER.

Witnesses:
OTTO FETTING,
I. W. FOLTZ.

Copies of this patent may be obtained for five cents each, by addressing the "Commissioner of Patents, Washington, D. C."